(12) United States Patent
Miyasaka et al.

(10) Patent No.: US 11,870,315 B2
(45) Date of Patent: Jan. 9, 2024

(54) ELECTRIC PUMP

(71) Applicant: SHINANO KENSHI CO., LTD., Ueda (JP)

(72) Inventors: Takeshi Miyasaka, Nagano (JP); Takahisa Tezuka, Nagano (JP); Naomi Koyama, Nagano (JP); Takuya Nakano, Nagano (JP)

(73) Assignee: SHINANO KENSHI CO., LTD., Ueda (JP)

( * ) Notice: Subject to any disclaimer, the term of this patent is extended or adjusted under 35 U.S.C. 154(b) by 369 days.

(21) Appl. No.: 17/111,754

(22) Filed: Dec. 4, 2020

(65) Prior Publication Data

US 2021/0257874 A1 Aug. 19, 2021

(30) Foreign Application Priority Data

Feb. 13, 2020 (JP) ................................. 2020-022028

(51) Int. Cl.
*H02K 3/52* (2006.01)
*F04D 13/06* (2006.01)
*F04D 29/18* (2006.01)
*F04D 29/40* (2006.01)
*H02K 3/28* (2006.01)
(Continued)

(52) U.S. Cl.
CPC ............ *H02K 3/522* (2013.01); *F04D 13/06* (2013.01); *F04D 13/064* (2013.01); *F04D 13/0606* (2013.01); *F04D 13/0693* (2013.01); *F04D 29/18* (2013.01); *F04D 29/406* (2013.01); *H02K 1/148* (2013.01); *H02K 3/04* (2013.01); *H02K 3/18* (2013.01); *H02K 3/28* (2013.01);
(Continued)

(58) Field of Classification Search
CPC .. F04D 13/06; F04D 13/0693; F04D 13/0606; F04D 13/064; H02K 3/04; H02K 3/28; H02K 3/32; H02K 3/18; H02K 3/522; H02K 1/148
USPC .......................................................... 310/71
See application file for complete search history.

(56) References Cited

U.S. PATENT DOCUMENTS 6,177,741 B1 * 1/2001 Lutkenhaus .......... F04D 13/064
310/91
6,914,356 B2 * 7/2005 Yamamura ............... H02K 3/50
310/71

(Continued)

FOREIGN PATENT DOCUMENTS

CN 1453922 A 11/2003
CN 103190060 A 7/2013
(Continued)

OTHER PUBLICATIONS

Nov. 2, 2021 Office Action issued in Japanese Patent Application No. 2020-022028.
(Continued)

*Primary Examiner* — Christopher S Bobish
(74) *Attorney, Agent, or Firm* — Oliff PLC

(57) ABSTRACT

An electric pump includes an impeller, a rotor connected to the impeller, a housing housing the rotor, a plurality of divided iron cores surrounding an outer surface of the housing, a plurality of divided coil bobbins respectively attached to the plurality of the divided iron cores, a plurality of divided coils respectively wound around the plurality of the divided coil bobbins, and a bus bar unit including a plurality of bus bars.

4 Claims, 8 Drawing Sheets

(51) Int. Cl.
*H02K 3/32* (2006.01)
*H02K 3/18* (2006.01)
*H02K 3/04* (2006.01)
*H02K 1/14* (2006.01)

(52) U.S. Cl.
CPC .......... *H02K 3/32* (2013.01); *H02K 2203/09* (2013.01); *H02K 2203/12* (2013.01)

(56) References Cited

U.S. PATENT DOCUMENTS

| | | | | |
|---|---|---|---|---|
| 8,519,583 B2* | 8/2013 | Sakaue | ................... | H02K 3/28 310/71 |
| 8,546,986 B2* | 10/2013 | Marchitto | .............. | H02K 3/521 310/179 |
| 9,263,918 B2* | 2/2016 | Burton | ................... | H02K 1/143 |
| 9,318,931 B2* | 4/2016 | Kim | ........................ | F04D 13/06 |
| 9,551,347 B2* | 1/2017 | Kim | ................... | F04D 13/0606 |
| 9,742,232 B2 | 8/2017 | Honda et al. | | |
| 9,866,080 B2* | 1/2018 | Kim | ................... | F04C 29/0085 |
| 9,926,929 B2* | 3/2018 | Takahashi | .............. | F04C 11/008 |
| 10,050,483 B2* | 8/2018 | Sambuichi | .............. | H02K 3/38 |
| 10,063,125 B2* | 8/2018 | Jang | ........................ | H02K 3/522 |
| 10,148,143 B2* | 12/2018 | Otsubo | ................... | H02K 7/08 |
| 11,056,946 B2* | 7/2021 | Takahashi | .............. | H02K 3/522 |
| 11,300,127 B2* | 4/2022 | Kataoka | ............. | F04D 13/0686 |
| 11,378,081 B2 | 7/2022 | Miyasaka | | |
| 2003/0201688 A1 | 10/2003 | Yamamura et al. | | |
| 2007/0273221 A1* | 11/2007 | Kinoshita | .............. | H02K 3/522 310/58 |
| 2010/0060090 A1* | 3/2010 | Sakata | ................... | H02K 3/522 310/71 |
| 2011/0175471 A1 | 7/2011 | Marchitto et al. | | |
| 2013/0181569 A1 | 7/2013 | Nakagawa et al. | | |
| 2013/0213325 A1* | 8/2013 | Kim | ........................ | F01P 5/12 417/423.1 |
| 2014/0042849 A1* | 2/2014 | Nishikata | ............... | H02K 7/083 310/91 |
| 2014/0091655 A1* | 4/2014 | Kajita | ................... | H02K 5/225 310/71 |
| 2015/0167694 A1* | 6/2015 | Harada | ................... | F04D 1/04 417/363 |
| 2016/0079822 A1 | 3/2016 | Noguchi | | |
| 2016/0329772 A1 | 11/2016 | Fukunaga | | |
| 2017/0093235 A1 | 3/2017 | Otsubo et al. | | |
| 2017/0310183 A1* | 10/2017 | Jang | ........................ | H02K 3/28 |
| 2018/0083516 A1* | 3/2018 | Endo | ........................ | H02K 7/14 |
| 2018/0238348 A1* | 8/2018 | Pawellek | ............ | F04D 13/0693 |
| 2019/0226491 A1* | 7/2019 | Kanai | ................ | F04D 29/5806 |
| 2019/0309754 A1* | 10/2019 | Lee | ...................... | F04D 29/5806 |
| 2019/0345944 A1 | 11/2019 | Miyasaka | | |
| 2020/0191161 A1* | 6/2020 | Svarre | ................. | F04D 13/0606 |
| 2021/0273515 A1* | 9/2021 | Bougrassa | ............. | H02K 1/187 |
| 2021/0320545 A1 | 10/2021 | Shimodaira et al. | | |

FOREIGN PATENT DOCUMENTS

| | | |
|---|---|---|
| CN | 103532312 A | 1/2014 |
| CN | 106560623 A | 4/2017 |
| EP | 3340440 A1 | 6/2018 |
| FR | 3083024 A1 | 12/2019 |
| JP | H06-225491 A | 8/1994 |
| JP | 2009-124926 A | 6/2009 |
| JP | 2014-176211 A | 9/2014 |
| JP | 2019-196754 A | 11/2019 |
| JP | 2019-210924 A | 12/2019 |
| WO | 2015/060058 A1 | 4/2015 |
| WO | 2019/053002 A1 | 3/2019 |
| WO | 2020/026710 A1 | 2/2020 |

OTHER PUBLICATIONS

Aug. 19, 2022 Notice of Allowance issued in U.S. Appl. No. 17/098,710.
May 4, 2021 Search Report issued in European Patent Application No. 20212997.9.
May 12, 2021 Search Report issued in European Patent Application No. 20209201.1.
Jun. 22, 2023 Office Action issued in Chinese Patent Application No. 202110042561.8.
Feb. 13, 2023 Article 94(3) EPC issued in European Patent Application No. 20212997.9.

* cited by examiner

ELECTRIC PUMP

CROSS-REFERENCE TO RELATED APPLICATION

This application is based upon and claims the benefit of priority of the prior Japanese Patent Application No. 2020-022028, filed on Feb. 13, 2020, the entire contents of which are incorporated herein by reference.

BACKGROUND

(i) Technical Field

The present disclosure relates to an electric pump.

(ii) Related Art

There is known an electric pump that is equipped with a plurality of divided iron cores, a plurality of divided coil bobbins respectively attached to the plurality of the divided iron cores, a plurality of divided coils respectively wound around the plurality of divided coil bobbins, and a plurality of bus bars conductively connected to the plurality of the divided coils (see, for example, Japanese Unexamined Patent Application Publication No. 2019-196754).

SUMMARY

According to an aspect of the present disclosure, there is provided an electric pump including: an impeller; a rotor connected to the impeller; a housing housing the rotor; a plurality of divided iron cores surrounding an outer surface of the housing; a plurality of divided coil bobbins respectively attached to the plurality of the divided iron cores; a plurality of divided coils respectively wound around the plurality of the divided coil bobbins; and a bus bar unit including a plurality of bus bars, wherein at least one of the plurality of the bus bars includes: a ring portion formed into a substantially C shape; and a hook portion extending radially outward from an outer radial periphery of the ring portion and curving to extend radially inward, at least one of the plurality of the divided coils includes: a wound portion wound around the divided coil bobbin; and an extended portion extended from the wound portion, and a part of the extended portion is engaged and welded with the hook portion.

DETAILED DESCRIPTION

Figure 1A:
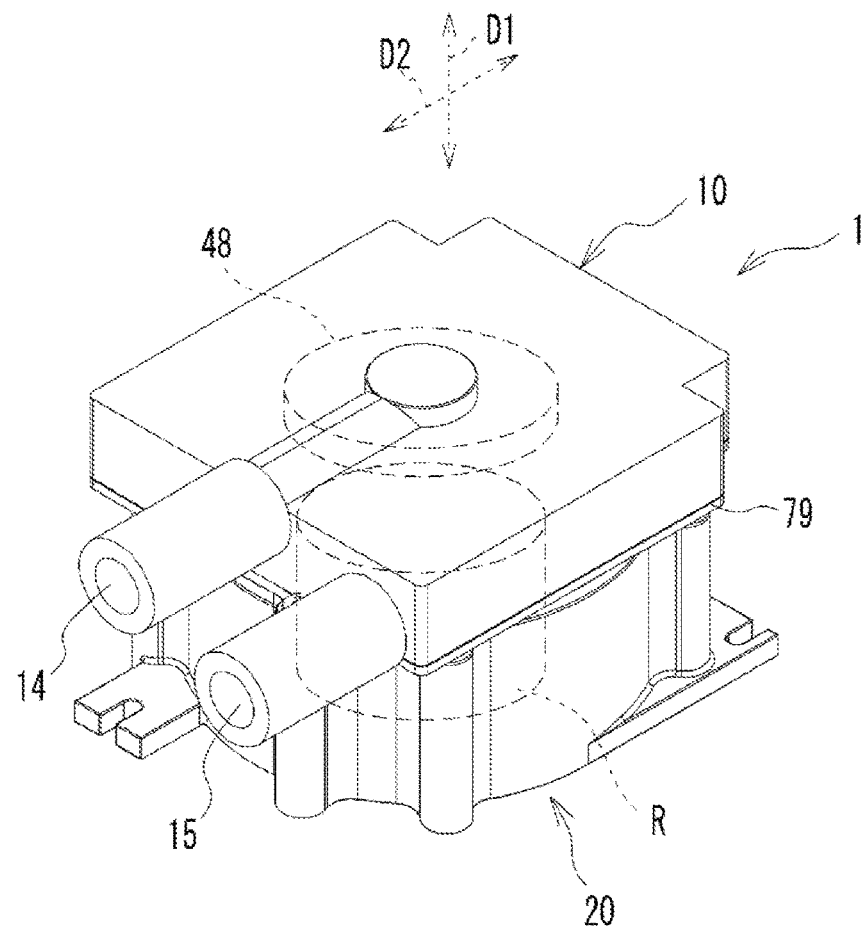
FIG. 1A is a perspective view of an electric pump.
Figure 1B:
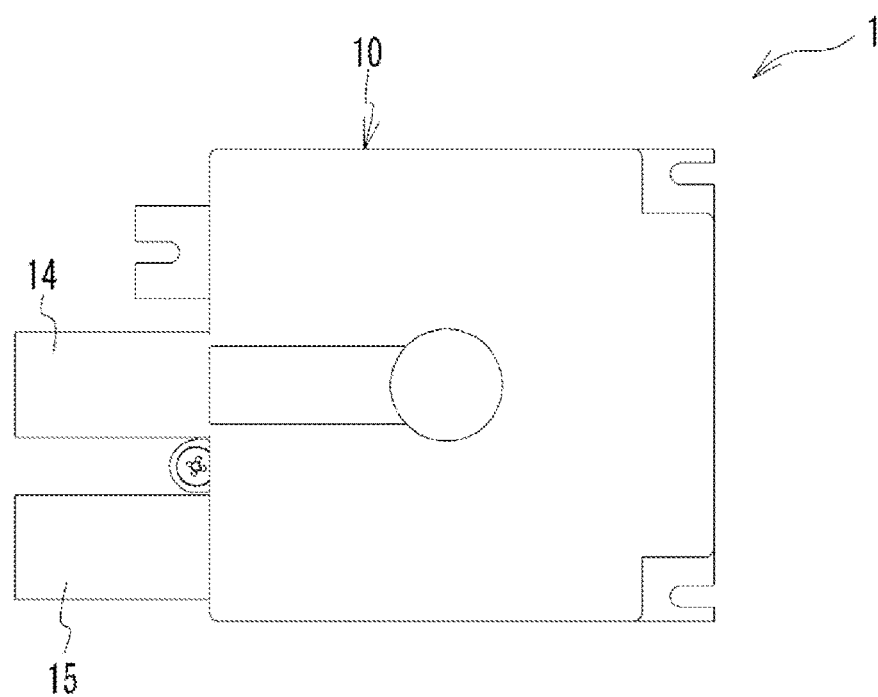
FIG. 1B is a top view of the electric pump.

FIG. 1A is a perspective view of an electric pump 1, and FIG. 1B is a top view of the electric pump 1. The electric pump 1 includes cases 10 and 20. The case 10 defines an internal space for housing an impeller 48. The internal space is connected to an introduction pipe portion 14 for introducing a fluid, which is a liquid, and to a discharge pipe portion 15 for discharging the fluid. The introduction pipe portion 14 and the discharge pipe portion 15 are substantially parallel to each other, and extend in a direction orthogonal to an axial direction D1 parallel to a rotational center axis of the impeller 48. A printed circuit board, described below, is provided within the case 10. The case 20 houses a motor M. FIG. 1 illustrates an orthogonal direction D2, which is orthogonal to the axial direction D1.

Figure 2:
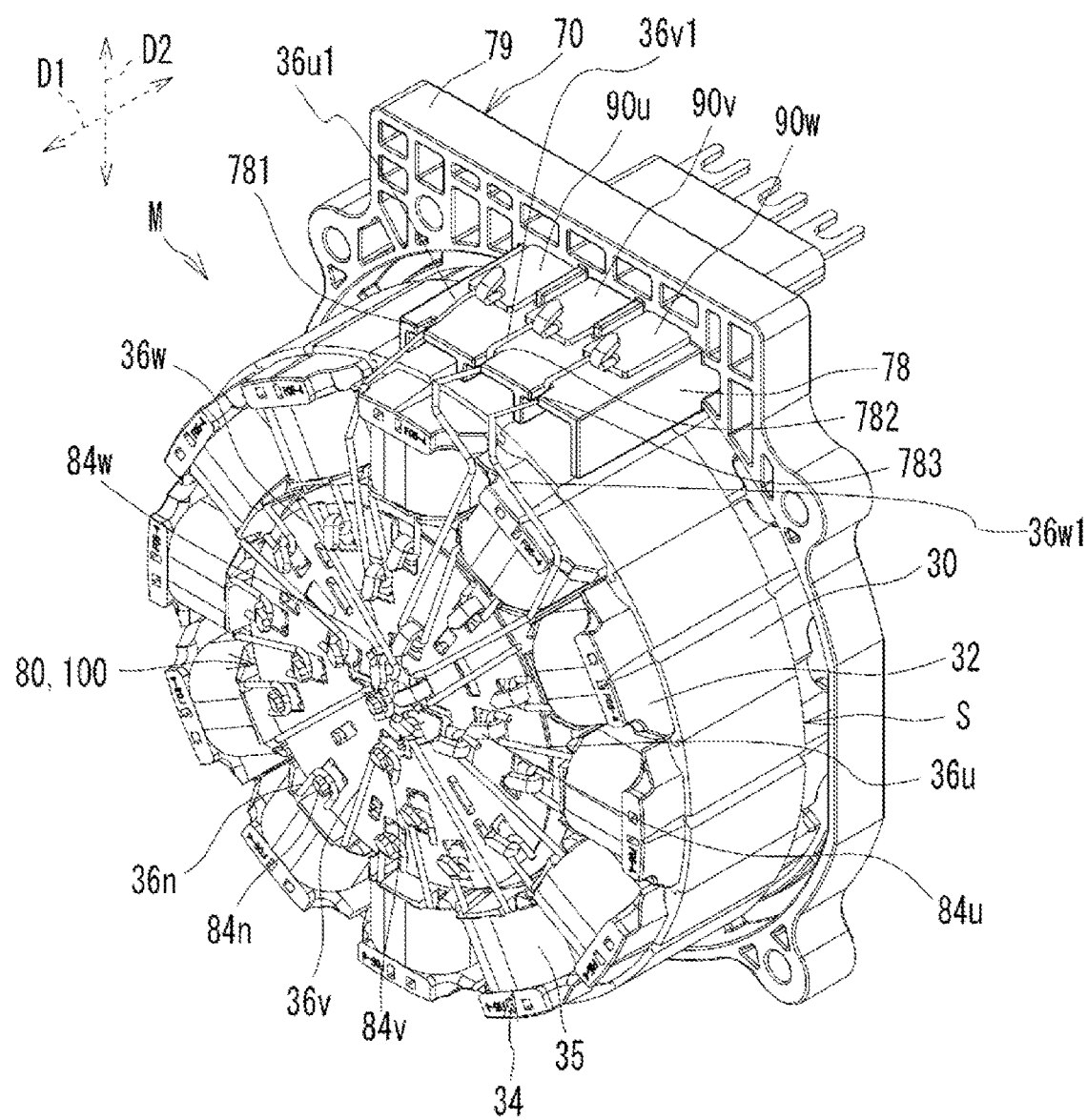
FIG. 2 is an explanatory view of a motor housed in a case.
Figure 3:
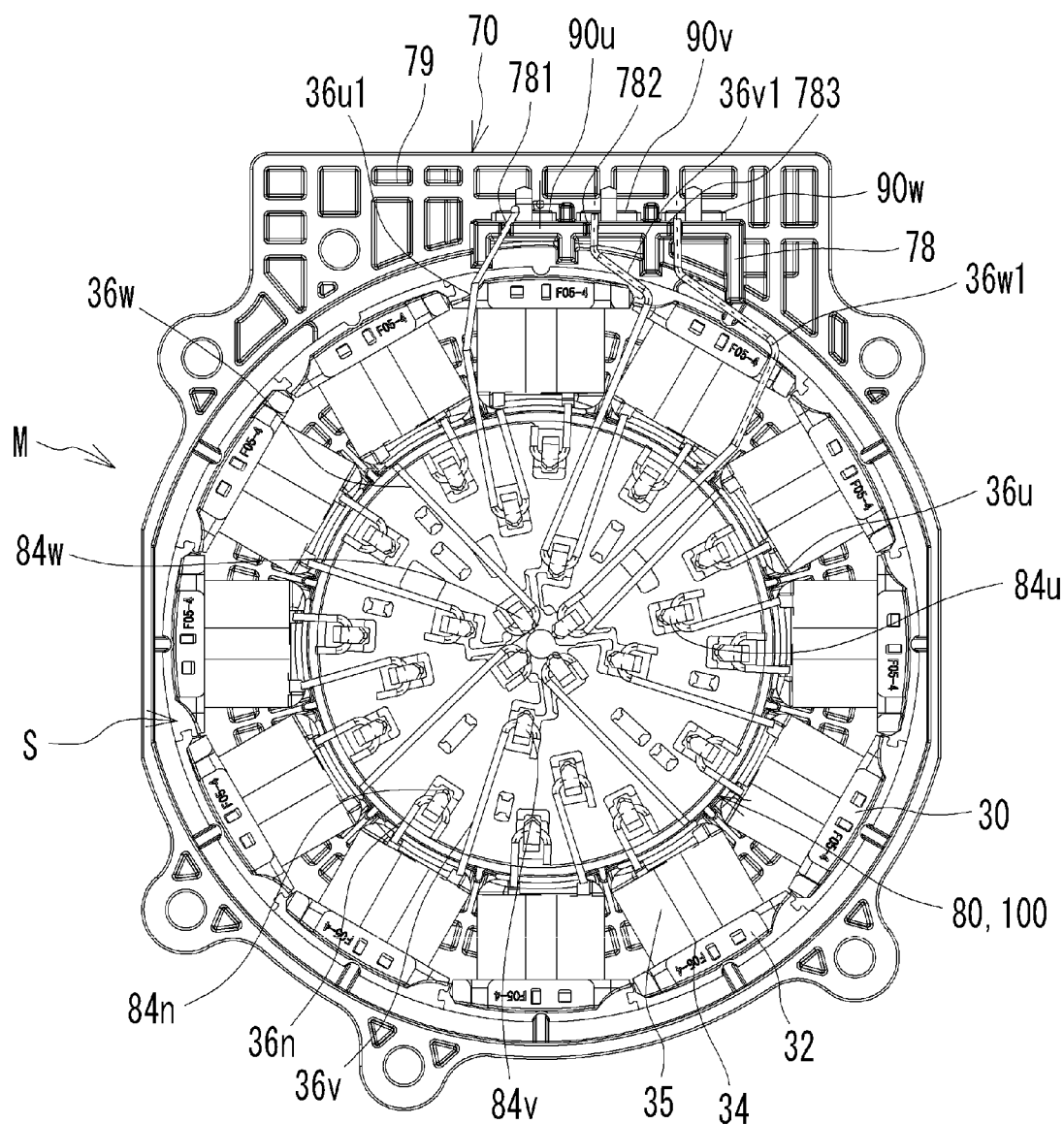
FIG. 3 is an explanatory view of the motor housed in the case.
Figure 4:
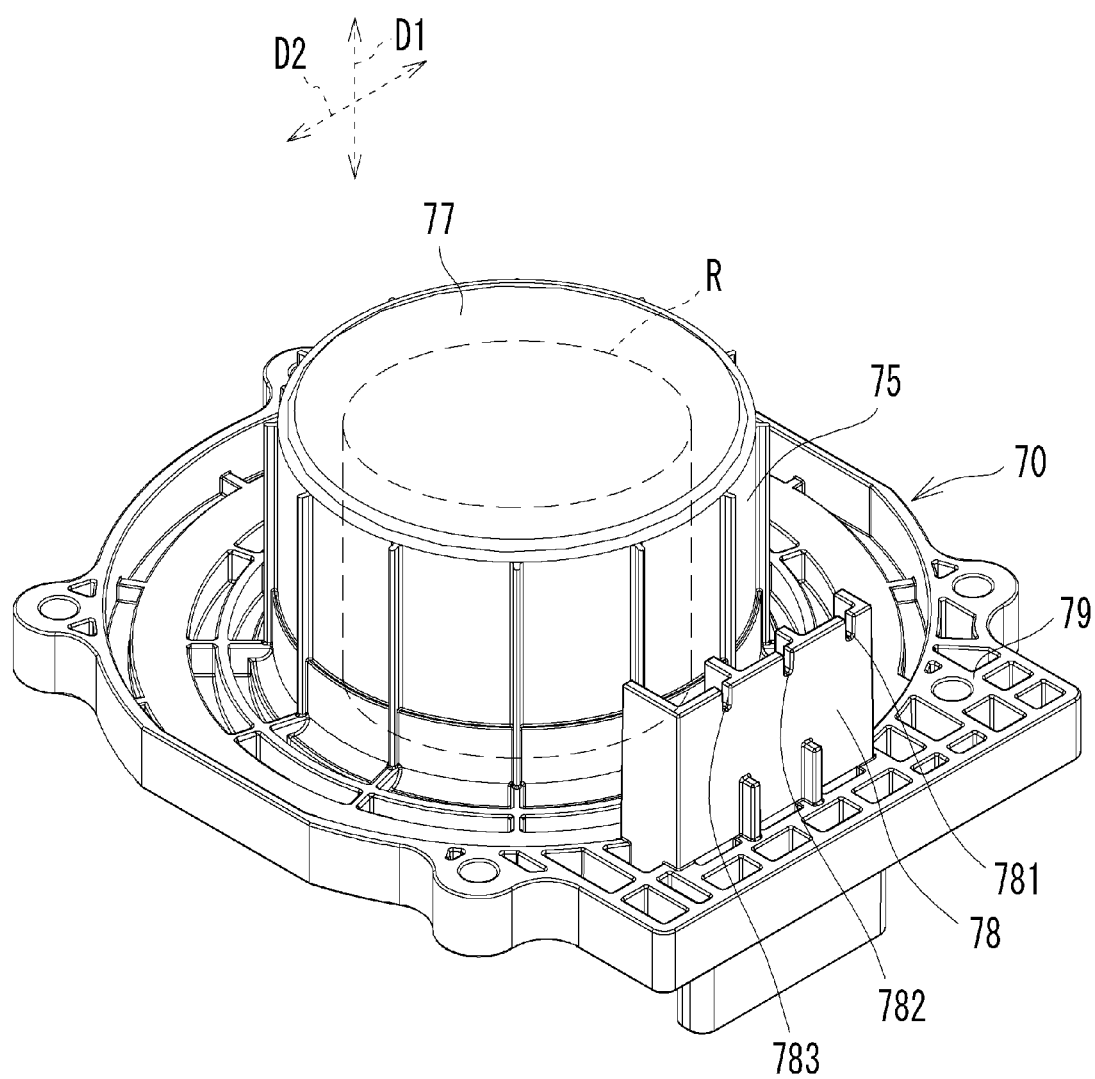
FIG. 4 is an external view of a housing of the motor.

FIGS. 2 and 3 are illustrative views of the motor M housed in the case 20. FIG. 4 is an external view of a housing 70 of the motor M. The motor M includes: a rotor R; the housing 70 housing the rotor R; a stator S disposed around the housing 70; and a bus bar unit 80. The stator S includes: a plurality of divided iron cores 30; a plurality of divided coil bobbins 32 respectively attached to the plurality of the divided iron cores 30; and a plurality of divided coils 34 respectively wound around the plurality of the divided coil bobbins 32. Twelve pairs of the divided iron core 30, the divided coil bobbin 32, and the divided coil 34 are provided, as will be described later in detail. The rotor R is provided with a plurality of permanent magnets facing an inner surface of a cylindrical portion 75 of the housing 70. The impeller 48 is connected to the permanent magnets, and the rotor R and the impeller 48 rotate together. When the impeller 48 rotates, fluid is introduced into the case 10 from the introduction pipe portion 14 and is discharged from the discharge pipe portion 15.

As illustrated in FIG. 4, the housing 70 includes the cylindrical portion 75, a bottom wall portion 77, a support plate 78, and a flange portion 79. The rotor R is housed within and surrounded by the cylindrical portion 75. Specifically, the rotor R is supported on the bottom wall portion 77 in a posture in which a rotational shaft of the rotor R is orthogonal thereto. The rotor R is rotatably supported by providing a sliding bearing between the rotational shaft and the rotor R. An inner peripheral surface of the cylindrical portion 75 faces the plurality of the permanent magnets fixed to an outer peripheral surface of the rotor R. The flange portion 79 extends radially outward from an end of the cylindrical portion 75 opposite to the bottom wall portion 77. The support plate 78 protrudes from the flange portion 79 in the axial direction D1. The protrusion height of the support plate 78 in the axial direction D1 from the flange portion 79 is set not to exceed the bottom wall portion 77. The support plate 78 is located not to contact with a stator S, as illustrated in FIG. 2. Guide grooves 781 to 783 are formed at an end of the support plate 78 opposite to the flange portion 79. As illustrated in FIGS. 2 and 3, the plurality of the divided iron cores 30 are circumferentially arranged to surround the outer surface of the cylindrical portion 75 of the housing 70. The housing 70 is made of, but not limited to, synthetic resin, and may be made of, for example, non-magnetic metal.

As illustrated in FIGS. 2, 3, and 4, the bus bar unit 80 and a sheet of insulating paper 100 are disposed on an outer surface of the bottom wall portion 77 of the housing 70. The bus bar unit 80 is conductively connected to the plurality of the divided coils 34 via extended portions 36 extended from the divided coils 34, as will be described later. Also, the bus bar unit 80 is conductively connected to terminal pins 90u, 90v, and 90w via the extended portions 36. The terminal pins 90u, 90v, and 90w are conductively connected to the printed circuit board for controlling a drive state of the motor M.

The terminal pins 90u, 90v, and 90w are supported by the support plate 78 and are respectively inserted into insertion holes formed in the flange portion 79. The support plate 78 is an example of a support portion.

Figure 5A:
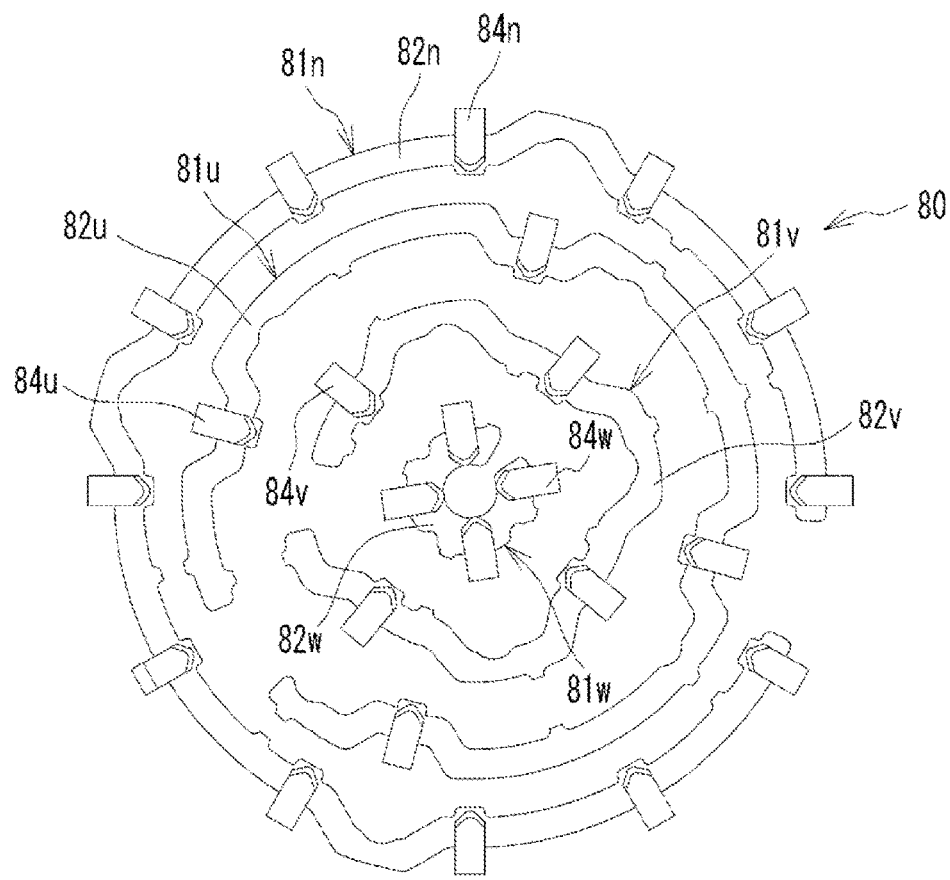
FIGS. 5A and 5B are explanatory views of a bus bar unit.
Figure 5B:
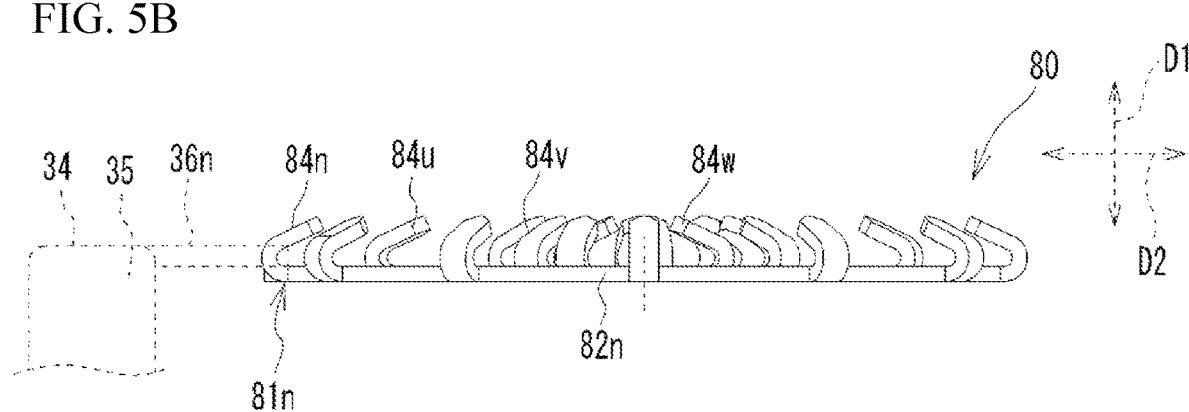

FIGS. 5A and 5B are explanatory views of the bus bar unit 80. FIG. 5A illustrates a front view of the bus bar unit 80. FIG. 5B illustrates a side view of the bus bar unit 80. The bas bar unit 80 includes bas bars 81n, 81u, 81v, and 81w each formed into a substantially C-shape. The bas bars 81n, 81u, 81v, and 81w are substantially and concentrically arranged on the same plane. The bus bars 81n, 81u, 81v, and 81w are made of a flat metal plate material made of copper or the like, and are punched and bent by pressing or the like. The bus bar 81n, which is a common bar, is disposed at the radially outermost position. The bus bar 81w is disposed at the radially innermost position. The bus bar 81u is disposed radially outward from the bus bar 81v. Therefore, diameter becomes smaller in an order of the bus bars 81n, 81u, 81v and 81w. The bus bars 81u, 81v, and 81w are provided for a U phase, a V phase, and a W phase, respectively.

The bus bar 81n includes a ring portion 82n and a plurality of hook portions 84n provided in the ring portion 82n. Likewise, the bus bar 81u includes a ring portion 82u and a plurality of hook portions 84u, the bus bar 81v includes a ring portion 82v and a plurality of hook portions 84v, and the bus bar 81w includes a ring portion 82w and a plurality of hook portions 84w. The ring portions 82n, 82u, 82v, and 82w have smaller circumferential lengths in this order. Each of the ring portions 82n, 82u, 82v, and 82w is formed into the substantial C-shape with both ends, and is formed such that its thickness in the axial direction D1 is smaller than its width in the radial direction. The substantial C-shape is not limited to a C-shape including a complete arc as illustrated in FIG. 5A, and may include a plurality of substantially linear portions with both ends facing each other, or may include a substantially linear portion and a substantially curved portion with both ends facing each other.

The hook portions 84n, 84u, 84v, and 84w extend radially outward from the outer radial periphery of the ring portions 82n, 82u, 82v, and 82w, and are curved radially inward, respectively. The hook portions 84n are provided at approximately equal angular intervals. The number of the hook portions 84n is equal to the number of the divided coils 34. Specifically, the twelve hook portions 84n are provided. The four hook portions 84u, the four hook portions 84v, and the four hook portions 84w are provided. FIG. 5B illustrates the divided coil 34, as will be described later in detail.

Figure 6A:
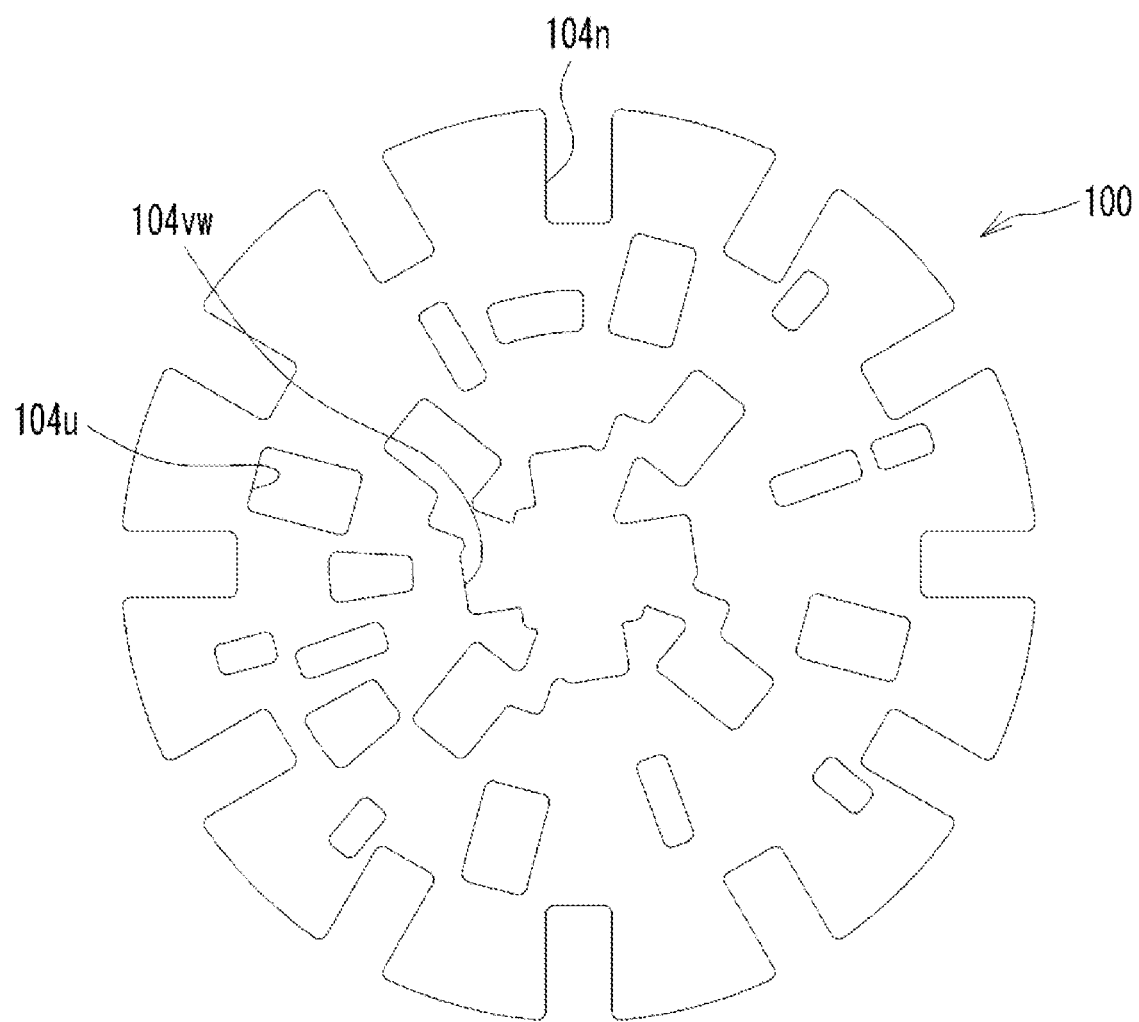
FIGS. 6A and 6B are explanatory views of a sheet of insulating paper.
Figure 6B:

FIGS. 6A and 6B are explanatory views of the insulating paper 100. FIG. 6A illustrates a front view of the insulating paper 100. FIG. 6B illustrates a side view of the insulating paper 100. The insulating paper 100 is formed into a substantially round shape and is formed with notches 104n on the outer circumferential edge so as to respectively expose the hook portions 84n. Openings 104u are formed in the insulating paper 100 so as to respectively expose the hook portions 84u. An opening 104vw is formed in the center of the insulating paper 100 so as to expose the four hook portions 84v and the four hook portions 84w. The insulating paper 100 covers the ring portions 82n, 82u, and 82v, but exposes the hook portions 84n, 84u, 84v, and 84w. Further, the insulating paper 100 is formed with other openings for other application.

As illustrated in FIGS. 2 and 3, the divided coil 34 for the U phase includes: a wound portion 35 wound around the divided coil bobbin 32; and extended portions 36u and 36n extended from the wound portion 35. The extended portion 36n is one end of the divided coil 34, and the extended portion 36u is the other end of the divided coil 34. Similarly, the divided coil 34 for the V phase includes the wound portion 35, and extended portions 36v and 36n. The divided coil 34 for the W phase includes the wound portion 35, and extended portions 36w and 36n. The extended portions 36n of the divided coils 34 for each phase are respectively welded with the hook portions 84n. The extended portions 36u, 36v, and 36w are engaged and welded with the hook portions 84u, 84v, and 84w, respectively. They are engaged and welded in this way, whereby conduction failure between the divided coils and the bus bars is suppressed.

The plurality of the hook portions 84n of the bus bars 81n are welded with the plurality of the extended portions 36n. The plurality of the hook portions 84n are arranged at approximately equal angle intervals. The same is true for the bus bars 81u, 81v, and 81w. Therefore, positional displacement of the bus bars 81n, 81u, 81v, and 81w is suppressed, even in a case where the bottom wall portion 77 of the housing 70 is not provided with positioning portions for restricting the respective positions of the bus bars 81n, 81u, 81v, and 81w. This suppresses, for example, a short circuit caused by positionally displacing the bus bars to contact with each other.

As seen from FIGS. 5B and 2, the bus bars 81n, 81u, 81v, and 81w of the bus bar unit 80 and the insulating paper 100 overlap the plurality of the divided coils 34 in the orthogonal direction D2. As a result, an increase in size of the motor M in the axial direction D1 is suppressed. This also suppresses an increase in size of the electric pump 1 in the axial direction D1. This also facilitates workability of engagement of the extended portion 36n of the divided coil 34 with the hook portion 84n.

As seen from FIGS. 3 and 5A, the extended portions 36u overlap the ring portion 82n of the bus bar 81n in the axial direction D1 through the insulating paper 100. This suppresses a short circuit caused by the contact of the extended portion 36u with the ring portion 82n. Likewise, the extended portions 36v overlap the ring portions 82n and 82u of the bus bars 81n and 81u through the insulating paper 100 in the axial direction D1, thus suppressing a short circuit caused by the contact of the extended portion 36v with any of the ring portions 82n and 82u. The extended portions 36w overlap the ring portions 82n, 82u, and 82v of the bus bars 81n, 81u, and 81v in the axial direction D1 through the insulating paper 100, thus suppressing a short circuit caused by the contact of the extended portion 36w with any of the ring portions 82n, 82u, and 82v. Further, since the bus bar unit 80 is covered with the insulating paper 100, the extended portions 36u, 36v, and 36w are arranged as close as possible to the bus bar unit 80 therealong, while suppressing the short circuit described above. Therefore, the size of the electric pump 1 in the axial direction D1 is reduced.

As illustrated in FIGS. 2 and 3, one extended portion 36u1 of the divided coil 34 for the U phase is engaged and welded with the hook portion 84u. An end of the extended portion 36u1 extended outside the stator S is inserted into and guided by the guide groove 781 of the support plate 78 to be conductively connected to the terminal pin 90u. Similarly, an end of one extended portion 36v1 of the divided coil 34 for the V phase is inserted into and guided by the guide groove 782 of the support plate 78 to be conductively connected to the terminal pin 90v. An end of one extended portion 36w1 of the divided coil 34 for the W phase is inserted into and guided by the guide groove 783 of the support plate 78 to be conductively connected to the terminal pin 90w. The guide grooves 781 to 783 are examples of guide portions and are not limited thereto. The guide portion may be a guide opening, for example, formed in the support plate 78 and capable of being inserted with the extended portion of the divided coil.

This makes the terminal pin 90u small, for example, as compared with a case where a terminal pin is extended from the outside of the stator S to the hook portion 84u through the stator S to be conductively connected to the hook portion 84u. The same is true for the terminal pins 90v and 90w. For this reason, a manufacturing cost is reduced.

Figure 7A:
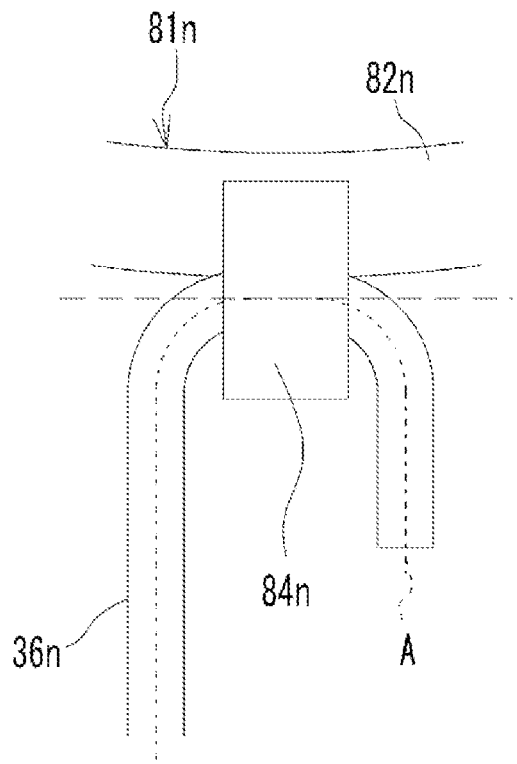
FIGS. 7A and 7B are enlarged views around a hook portion of the bus bar before welding.
Figure 7B:
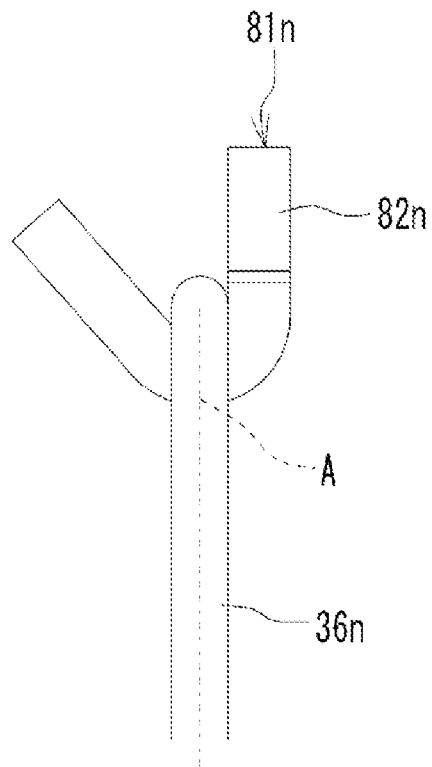
Figure 8A:
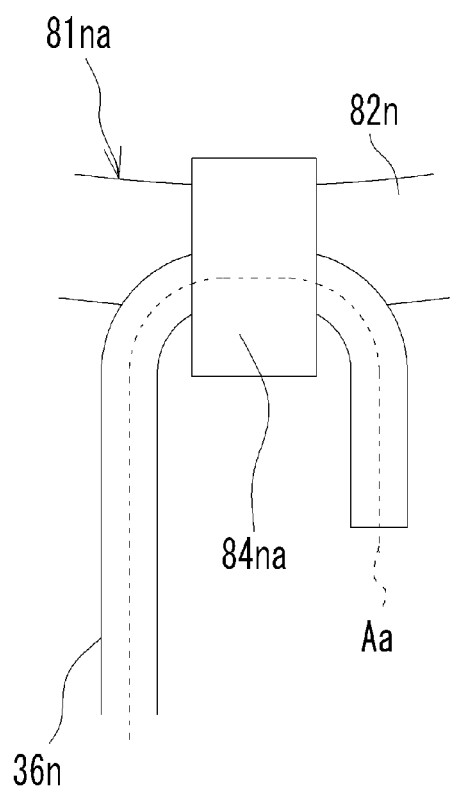
FIGS. 8A and 8B are enlarged views around a hook portion of a bus bar according to a variation before welding.
Figure 8B:
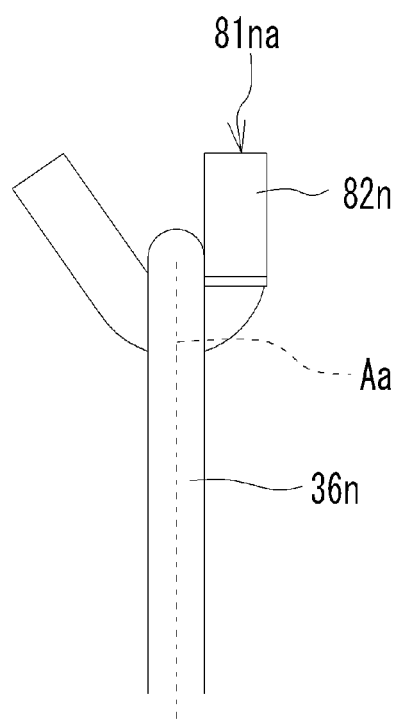

FIGS. 7A and 7B illustrate an enlarged view around the hook portion 84n of the bus bar 81n before welding. An example of welding is resistance welding. After resistance welding, the hook portion 84n is bent toward the bus bar 81n in the axial direction D1, and deforms to enclose the extended portion 36n. In FIGS. 7A and 7B, a central axis A of the extended portion 36n is illustrated in a dotted line. The central axis A at the point of engagement of the extended portion 36n with the hook portion 84n does not overlap the ring portion 82n when viewed in the axial direction D1. FIGS. 8A and 8B are enlarged views around a hook portion 84na of a bus bar 81na according to a variation before welding. A manner of welding is the same as the manner described above in FIGS. 7A and 7B. In FIGS. 8A and 8B, a central axis Aa of the extended portion 36n is illustrated in a dotted line. In the bus bar 81na according to the variation, the central axis Aa at the point of engagement of the extended portion 36n with the hook portion 84na overlaps the ring portion 82n when viewed in the axial direction D1. When the central axis Aa overlaps the ring portion 82n in the variation, the extended portion 36n might rise away from the ring portion 82n in the axial direction D1 around the point where the extended portion 36n engages with the hook portion 84na. This might increase the size of the electric pump in the axial direction D1. In addition, the extended portion 36n is engaged with the hook portion 84na, and then is welded therewith by resistance welding. At this time, an electrode of resistance welding might contact with a rising portion of the extended portion 36n around the hook portion 84na before the electrode contacts with the hook portion 84na, and then electric current might flow from the extended portion 36n to the divided coil 34, so that welding might not be performed properly. In the present embodiment, the central axis A at the point of engagement of the extended portion 36n with the hook portion 84n does not overlap the ring portion 82n in viewed in the axial direction D1, thereby suppressing the rising of the extended portion 36n, and achieving suitable welding. For this reason, as illustrated in FIGS. 7A and 7B, preferably, the central axis A at the point of engagement of the extended portion 36n with the hook portion 84n does not overlap the ring portion 82n in viewed in the axial direction D1.

While the exemplary embodiments of the present invention have been illustrated in detail, the present invention is not limited to the above-mentioned embodiments, and other embodiments, variations and variations may be made without departing from the scope of the present invention.

Although the above electric pump 1 is for introducing and discharging a liquid, the present invention may be applied to an electric pump for introducing and discharging a gas as a fluid.

In the above present embodiment, the bottom wall portion 77 overlaps all of the divided coils 34 in the orthogonal direction D2, but is not limited thereto. The bottom wall portion 77 may overlap at least a part of the plurality of the divided coils 34 in the orthogonal direction D2.

Although the insulating paper 100 is described as an example of an insulating member, it is not limited to the insulating paper 100. For example, the insulating member may be a thin sheet of rubber.

In the above present embodiment, the welding is resistance welding, but it is not limited thereto. The welding may be arc welding, electron beam welding, brazing, gas welding, explosion welding, ambient temperature pressure welding, friction welding, ultrasonic pressure welding, diffusion welding, or laser welding.

What is claimed is:
1. An electric pump comprising:
an impeller;
a rotor connected to the impeller;
a housing that houses the rotor;
a plurality of divided iron cores surrounding an outer surface of the housing;
a plurality of divided coil bobbins respectively attached to the plurality of the divided iron cores;
a plurality of divided coils respectively wound around the plurality of the divided coil bobbins;
a plurality of bus bars; and
an insulating member,
wherein
at least one of the plurality of the bus bars includes:
a ring portion that is a substantially C shape, and
a hook portion that extends outward from an outer radial periphery of the ring portion along a plane perpendicular to an axis of the rotor and is bent to extend radially inward so that the hook portion overlaps itself along a direction parallel to the axis;
at least one of the plurality of the divided coils includes:
a wound portion wound around the divided coil bobbin, and
an extended portion that extends from the wound portion;
a part of the extended portion is engaged and welded with the hook portion;
the insulating member includes an opening to expose the hook portion and covers the plurality of the bus bars; and
the extended portion engaged and welded with the hook portion is extended from the wound portion, and overlaps, with the insulating member in between, a portion of another of the plurality of the bus bars located radially outside from the bus bar with the hook portion.

2. The electric pump according to claim 1, wherein a central axis of the extended portion at a point of engagement with the hook portion is radially outside the ring portion when viewed in an axial direction of the rotor.

3. The electric pump according to claim 1, wherein
the plurality of the bus bars each includes an additional one of the ring portion and an additional one of the hook portion,
the plurality of the divided coils each includes an additional one of the wound portion and an additional one of the extended portion, and
parts of the plurality of the extended portions are engaged and welded with the plurality of the hook portions, respectively.

4. The electric pump according to claim 1, wherein the plurality of the bus bars overlaps the plurality of the divided coils in a direction orthogonal to an axial direction of the rotor.

* * * * *